United States Patent Office 2,821,543
Patented Jan. 28, 1958

2,821,543

PRODUCTION OF UNSATURATED ALIPHATIC ESTERS

Robert W. Etherington, Jr., Corpus Christi, Tex., assignor to Celanese Corporation of America, New York, N. Y., a corporation of Delaware No Drawing. Application January 10, 1955
Serial No. 481,016

12 Claims. (Cl. 260—486)

This invention relates to the production of esters of $\alpha,\beta$-ethylenically unsaturated monocarboxylic acids, and relates more particularly to the production of alkyl acrylates or methacrylates.

It is an object of this invention to provide a novel method for producing esters of $\alpha,\beta$-ethylenically unsaturated monocarboxylic acids, using formaldehyde as a reactant.

Another object of this invention is the preparation of alkyl acrylates from formaldehyde and alkyl acetates, or alkyl methacrylates from formaldehyde and alkyl propionates.

Other objects of this invention will be apparent from the following detailed description and claims.

In accordance with the process of this invention formaldehyde is reacted with an ester of a monofunctional aliphatic carboxylic acid in the vapor phase at an elevated temperature. The reaction is advantageously carried out in the presence of a fluidized solid catalyst.

Examples of esters which may be employed as reactants in the process of this invention are methyl acetate, methyl propionate, and esters of other alcohols and fatty acids having at least two carbon atoms, such as ethyl, propyl, or butyl acetate or propionate. While it is preferred to employ acetates or propionates, esters of other acids may be used. Thus methyl or other alkyl butyrate may be reacted according to this invention to yield the corresponding alkyl ethacrylate.

In carrying out the process of this invention it is advantageous to employ formaldehyde of low water content. One convenient source of formaldehyde of this type is the solution produced by dissolving paraformaldehyde containing 5 to 10% of water, in methanol or other lower aliphatic alcohol, e. g. butanol. The formaldehyde may also be supplied in the form of the monomeric vapors produced by the heating of trioxane or other formaldehyde-yielding compounds. Other sources of the formaldehyde include paraform and methylal.

The ratios of the reactants may be varied. A preferred range is about 0.3 to 3 moles of formaldehye for each mole of ester reactant.

The catalysts employed in the practice of this invention are preferably in finely-divided fluidized form, the size of the catalyst particles being advantageously in the range of about 60 to 200 mesh (U. S. Standard). The catalyst is preferably a basic metal compound such as a basic salt or oxide. Thus, such materials as manganese oxides, sodium phosphate, sodium pyrophosphate, zinc oxide, lead oxide, sodium hydroxide, manganese acetate and lead acetate have been employed successfully. In the case of the acetate salts these are probably decomposed to the oxide during the initial stages of the reaction. Advantageously the catalyst particles comprise a suitable carrier, such as activated alumina or activated silica, coated with one or more of the aforementioned metal compounds. If desired a fixed bed of catalyst, rather than a fluidized bed, may be employed.

The reaction between the formaldehyde and the monofunctional aliphatic ester is, as stated, conducted at an elevated temperature. Preferably the reaction temperature is in the range of about 250 to 400° C., optimum results being obtained at temperatures of about 340 to 370° C. The reaction may be carried out at atmospheric, subatmospheric or superatmospheric pressure.

The esters of $\alpha,\beta$-ethylenically unsaturated acids produced by the process of this invention may be recovered in any suitable manner. Thus, the hot reaction products may be condensed by cooling and the condensate may be subjected to distillation to separate the desired ester therefrom.

The following examples are given to illustrate this invention further. All proportions are by weight unless otherwise indicated.

*Example I*

There is prepared a mixture of 37 parts of methyl acetate and 100 parts of a solution prepared by dissolving paraformaldehyde in methanol, which solution contains 46% of formaldehyde, 44% of methanol and 10% of water. This mixture is vaporized continuously by feeding a stream of the mixture to heated flasher and the resulting vapors are then passed continuously through a fluidized catalyst bed maintained at a temperature of 380 to 400° C. The catalyst is composed of particles of activated silica gel of 80 to 200 mesh particle size carrying on their surfaces 10%, based on the total weight of catalyst particles, of manganese oxides, calculated as $MnO_2$. The catalyst bed is maintained in the fluidized state merely by the action of the stream of reactants. The contact time between the reactants and the catalyst is 4 seconds. The vapors leaving the bed of catalyst are liquefied by passing them into a cooled condenser. Methyl acrylate is recovered from the condensate by distillation. The entire process is carried out at substantially atmospheric pressure.

The catalyst is prepared by mixing the silica gel particles with an amount of a water solution of manganous acetate just sufficient to wet the silica gel completely, allowing the mixture to stand for one hour, then drying the mixture overnight in an oven at 85 to 100° C., and thereafter heating the dried particles, in the fluidized state, in a stream of air at a temperature of 350° C. for one hour.

*Example II*

Example I is repeated except that the 37 parts of methyl acetate are replaced by 44 parts of methyl propionate. Methyl methacrylate is recovered from the condensate by distillation.

*Example III*

Example I is repeated except that the mixture fed to the flasher is made up of 80 parts of trioxane dissolved in 88 parts of methyl propionate and the temperature of the catalyst is maintained at 350 to 360° C. Methyl methacrylate and a compound identified by mass spectrographic analysis as $\alpha$-methacrolein are recovered from the vapors leaving the bed of catalyst.

*Example IV*

Example III is repeated except that the amount of trioxane is 30 parts rather than 80 parts and the catalyst is made up of lead oxides, in place of manganese oxides, on activated silica gel, the catalyst being prepared in the same manner as that of Example I except for the substitution of lead acetate for the manganous acetate. Methyl methacrylate and a compound identified by mass spectrographic analysis as $\alpha$-methacrolein are recovered from the vapors leaving the bed of catalyst.

It is to be understood that the foregoing detailed description is merely given by way of illustration and that many variations may be made therein without departing from the spirit of my invention.

Having described my invention, what I desire to secure by Letters Patent is:

1. Process for the production of unsaturated esters which comprises reacting, in the vapor phase and at elevated temperature, formaldehyde and an ester of an alkanol and an alkanoic acid, said acid having a plurality of carbon atoms and having a plurality of hydrogen atoms on its alpha carbon atom, in the presence of a solid fluidized catalyst for the reaction, the proportions of the reactants being about 0.3 to 3 mols of formaldehyde for each mol of said alkanoic ester, to produce an ester of an α,β-ethylenically unsaturated monocarboxylic acid containing one more carbon atom than the acid of the ester used as a reactant.

2. Process for the production of unsaturated esters which comprises reacting, in the vapor phase and at elevated temperature, formaldehyde and an ester of a lower alkanol and a lower alkanoic acid, said acid having a plurality of carbon atoms and having a plurality of hydrogen atoms on its alpha carbon atom, in the presence of a solid basic metal fluidized catalyst for the reaction, the proportions of the reactants being about 0.3 to 3 mols of formaldehyde for each mol of said alkanoic ester, to produce an ester of an α,β-ethylenically unsaturated monocarboxylic acid containing one more carbon atom than the acid of the ester used as a reactant.

3. Process for the production of unsaturated esters which comprises reacting, in the vapor phase and at elevated temperature, formaldehyde and methyl acetate in the presence of a fluidized solid catalyst for the reaction, the proportions of the reactants being about 0.3 to 3 mols of formaldehyde per mol of methyl acetate, to produce methyl acrylate, and recovering methyl acrylate from the resulting reaction mixture.

4. Process for the production of unsaturated esters which comprises reacting, in the vapor phase and at elevated temperature, formaldehyde and methyl propionate in the presence of a fluidized solid catalyst for the reaction, the proportions of the reactants being about 0.3 to 3 mols of formaldehyde per mol of methyl propionate, to produce methyl methacrylate, and recovering methyl methacrylate from the resulting reaction mixture.

5. Process for the production of unsaturated esters which comprises vaporizing methyl acetate and a solution of formaldehyde in methanol, reacting the methyl acetate and formaldehyde by passing the resulting vapors through a heated fluidized solid basic metal catalyst for the reaction, the proportions of the reactants being about 0.3 to 3 mols of formaldehyde per mol of methyl acetate, and recovering methyl acrylate from the resulting reaction products.

6. Process for the production of unsaturated esters which comprises vaporizing methyl propionate and a solution of formaldehyde in methanol, reacting the methyl propionate and formaldehyde by passing the resulting vapors through a heated fluidized solid basic metal catalyst for the reaction, the proportion of the reactants being about 0.3 to 3 mols of formaldehyde per mol of methyl propionate, and recovering methyl methacrylate from the resulting reaction products.

7. Process for the production of unsaturated esters which comprises vaporizing methyl acetate and trioxane, reacting the materials by passing the resulting vapors through a heated fluidized solid basic metal catalyst for the reaction, the proportions of the reactants being about 0.3 to 3 mols of trioxane, calculated as formaldehyde, per mol of methyl acetate, and recovering methyl acrylate from the resulting reaction products.

8. Process for the production of unsaturated esters which comprises vaporizing methyl propionate and trioxane, reacting the materials by passing the resulting vapors through a heated fluidized solid basic metal catalyst for the reaction, the proportions of the reactants being about 0.3 to 3 mols of trioxane, calculated as formaldehyde, per mol of methyl propionate, and recovering methyl methacrylate from the resulting reaction products.

9. Process as set forth in claim 2 in which the catalyst comprises a basic metal compound at a temperature of about 250 to 400° C.

10. Process as set forth in claim 2 in which the catalyst is a basic metal compound supported on a carrier selected from the group consisting of activated silica and activated alumina.

11. Process as set forth in claim 2 in which the catalyst comprises manganese oxide.

12. Process as set forth in claim 2 in which the catalyst comprises lead oxide.

References Cited in the file of this patent

UNITED STATES PATENTS

| | | |
|---|---|---|
| 2,313,501 | Bachman et al. | Mar. 9, 1943 |
| 2,467,927 | Ardis | Apr. 19, 1949 |
| 2,517,006 | MacLean | Aug. 1, 1950 |
| 2,734,074 | Redmon | Feb. 7, 1956 |

FOREIGN PATENTS

| | | |
|---|---|---|
| 835,834 | France | Oct. 3, 1938 |

OTHER REFERENCES

Blaise et al.: Ber. Soc. Chim. (France) (3) 33 (1905), pgs. 635–8.

Walker: "Formaldehyde" Ind. Edition (1953), pgs. 275–9.